(12) United States Patent
Amini

(10) Patent No.: US 6,597,177 B1
(45) Date of Patent: *Jul. 22, 2003

(54) THROUGH CASING RESISTIVITY MEASUREMENT IN PERMANENTLY INSTALLED DOWNHOLE PRODUCTION ENVIRONMENT

(75) Inventor: Bijan K. Amini, Houston, TX (US)

(73) Assignee: Em-Tech Sensors LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/716,340

(22) Filed: Nov. 20, 2000

(51) Int. Cl.[7] .............................. G01V 3/18; G01V 3/28
(52) U.S. Cl. ........................ 324/339; 324/346; 324/368
(58) Field of Search .................................. 324/332, 334, 324/333, 339, 346, 368, 338, 117 R, 345, 355

(56) References Cited

U.S. PATENT DOCUMENTS

| | | | |
|---|---|---|---|
| 3,277,363 A | * 10/1966 | Schuster | ...................... 324/323 |
| 3,574,458 A | 4/1971 | Hollis | |
| 3,617,779 A | 11/1971 | Rosenberg | |
| 3,851,236 A | 11/1974 | Dennhardt | |
| 3,995,835 A | 12/1976 | Clichy | |
| 4,679,936 A | 7/1987 | Gerharz | |
| 5,038,107 A | 8/1991 | Gianzero | |
| 5,132,623 A | 7/1992 | De | |
| 5,150,446 A | 9/1992 | Penner | |
| 5,260,661 A | 11/1993 | Vail | |
| 5,283,520 A | 2/1994 | Martin | |
| 5,426,367 A | 6/1995 | Martin | |
| 5,610,517 A | 3/1997 | Ma | |
| 5,633,182 A | 5/1997 | Miyawaki | |
| 5,654,639 A | 8/1997 | Locatelli | |
| 5,698,977 A | 12/1997 | Simpson | |
| 5,751,144 A | 5/1998 | Weischedel | |
| 5,839,508 A | * 11/1998 | Tubel et al. | ................ 166/65.1 |
| 5,942,894 A | 8/1999 | Wincheski | |
| 5,969,254 A | 10/1999 | Yamaguchi | |
| 6,008,657 A | 12/1999 | Suyama | |
| 6,025,721 A | 2/2000 | Vail | |
| 6,084,403 A | 7/2000 | Sinclair | |
| 6,097,532 A | 8/2000 | Harris | |
| 6,100,696 A | 8/2000 | Sinclair | |
| 6,157,195 A | 12/2000 | Vail | |
| 6,294,917 B1 | * 9/2001 | Nichols | ...................... 324/339 |
| 2001/0038287 A1 | * 11/2001 | Amini | ...................... 324/341 |

* cited by examiner

Primary Examiner—Edward Lefkowitz
Assistant Examiner—Darrell Kinder
(74) Attorney, Agent, or Firm—David McEwing

(57) ABSTRACT

A method and apparatus for measuring changes in the media within a geologic formation by transmitting magnetic flux through a section of ferromagnetic well casing and measuring the change in flux received back through the casing. The flux transmitter and receiving components may be permanently installed in a hydrocarbon production well.

41 Claims, 9 Drawing Sheets

THROUGH CASING RESISTIVITY MEASUREMENT IN PERMANENTLY INSTALLED DOWNHOLE PRODUCTION ENVIRONMENT

BACKGROUND OF THE INVENTION

1. Field of the Invention

The present invention relates generally to measuring resistivity of media such as liquids, gases or other objects within a geologic formation through a well casing. Specifically, the present invention relates to through casing resistivity measurement in permanently installed downhole hydrocarbon production environments. The present invention provides an apparatus and method for measuring the resistivity of a formation in the vicinity of a well. The current invention, in one embodiment, is an apparatus that can be fixed inside the casing of an oil or gas producing well in many configurations for measuring the resistivity of the surrounding formation. The apparatus monitors changes in resistivity by continuous or periodic sampling. Any medium which provides for changes in resistivity are measurable, including for example changing concentrations of oil, water and gas in the formation. The apparatus can also detect the location and amplitude of said resistivity change in single or multiple directions, and at distances that will help operators of wells adjust their production management and their reservoir management activities. The invention includes fixed-inside-the-casing sensors, the associated method of introduction and operation in the well, the method of collecting the data and transmitting to the above ground control systems, and the interpretation and display of the results.

2. Description of Related Art

In the development and production of oil and gas reservoirs, there is a very significant need to increase the amount and accuracy of information regarding the composition and changes in the composition of the resource-bearing zones of the formation. Resistivity measurement has long been used to characterize properties of the immediately surrounding substrates prior to the inception of production. However, such measurements can only be taken prior to setting casing or while the formation itself is otherwise "exposed" to the logging tool i.e., without an interceding material that acts as a barrier between the logging tool and the formation substrate. Thus, there has always been a need to provide the capability for continuous or periodic measurements of formation resistivity for a permanent hydrocarbon production well installation. Specifically, there has been a need to be able to "see through" the production tubing or well casing to the geologic formation or formation substrate located outside a section of the production well. There also has long been a need to provide resisitivity measurements without interruption of the hydrocarbon production well. There is also a great need for the ability to simultaneously (i) generate a magnetic flux, by conventional means, within the confines of a permanently installed hydrocarbon production well, (ii) create magnetic transparency zone within and through the well casing or production tubing of such a hydrocarbon production well, and (iii) receive and measure through the well casing or production tubing magnetic flux that may be generated in the media in the geologic formation outside of the well casing. It is already known to those skilled in the art that such measurements can provide information about the resistivity of media, and hence the composition or change in the media outside of the well.

However, existing measurements of the resistivity of the media within a geologic formation are taken with logging tools deployed prior to commencement of actual production or in a work-over situation. Yet, after production is underway, it is generally not possible to measure the resistivity of the surrounding geologic formation without interruption of the well production and penetration or removal of the well casing. As is known to those skilled in the industry, the formation resistivity varies as a result of (among other reasons) the changing proportion of hydrocarbon to water. Having the ability to measure at selected locations and directions over time would provide for the unique ability to monitor, for example, the change in the percentage of water versus either oil, gas, or other materials approaching the well, far in advance of such change in fluids actually entering the well. The benefits of such measurements include the ability to see changes in the resistivity of the formation over time in a non-obtrusive and highly accurate way even after the well is in production.

SUMMARY OF THE INVENTION

The invention subject of this invention provides a method and apparatus for continuous or periodic measurements of formation resistivity for a permanent hydrocarbon production well installation. Well casing and production tubing are commonly manufactured of materials that are electrically conductive and magnetically permeable. These materials are referred to as EM Barriers or Barrier Materials. The present invention creates transparencies within electrically conductive and magnetically permeable materials. Such materials include ferromagnetic and paramagnetic materials. Specifically, the method and apparatus of the invention creates transparencies in the well casing or production tubing. These transparencies permit magnetic flux to be transmitted through the casing, etc. The method and apparatus of the invention further includes the capability of generating magnetic flux to magnetically saturate a portion of the well casing or production tubing, transmitting magnetic flux through the transparency and measuring magnetic flux received from the surrounding geologic formation. The present invention also provides the ability to perform these activities continuously without interruption of the well production.

BRIEF DESCRIPTION OF THE DRAWINGS

The accompanying drawings, which are incorporated in and constitute a part of the specification, illustrate preferred embodiments of the invention. These drawing, together with the general description of the invention given above and the detailed description of the preferred embodiments given below, serve to explain the principles of the invention for resistivity measurement of geologic formations from within a permanently installed ferromagnetic casing or similar material.

The above general description and the following detailed description are merely illustrative of the subject invention, and additional modes, advantages, and particulars of this invention will be readily suggested to those skilled in the art without departing from the spirit and scope of the invention.

DETAILED DESCRIPTION OF THE PREFERRED EMBODIMENTS

To achieve the foregoing objects, features, and advantages and in accordance with the purpose of the invention as embodied and broadly described herein, a method and apparatus is provided for measuring resistivity of the geologic formation surrounding a hydrocarbon production well through a permanently installed down-hole production well casing.

Hydrocarbon production wells further comprise a permanently installed outer casing made of a ferromagnetic material. The outside diameter of the case may be of a range of 7 to 10 inches and have an interior diameter of 7 to 5 inches. The thickness of the casing is typically 1 inch thick. Placed inside the permanent casing is a smaller production tubing. The outer diameter of the production tubing may be in a range of 1 to 4 inches. Hydrocarbon, such as crude oil mixed with salt water or solid particles such as sand, flows through the production tubing at a high velocity. This environment is a harsh and corrosive, sometimes requiring the replacement of the production tubing.

Figure 1:
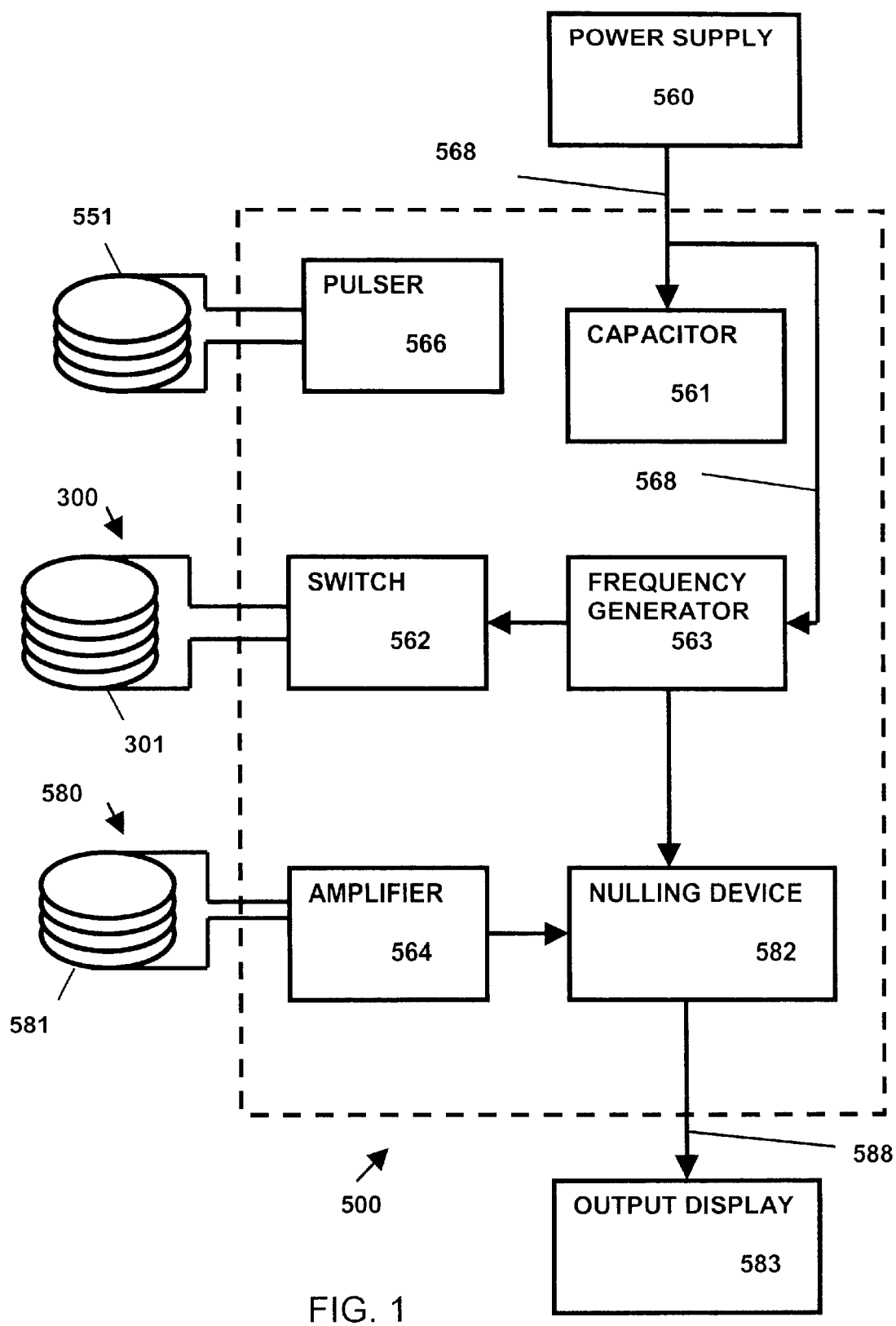
FIG. 1 illustrates a schematic outline of the some of the components utilized in the invention for creating Metallic Transparencies™, and transmitting and receiving magnetic flux.

The apparatus of the subject invention utilizes three or more components permanently installed within the well casing of a hydrocarbon, production well. FIG. 1 illustrates schematically one embodiment of these components. The combination of these components, along with other components typically located at the surface, comprise a "Magnetic Transparency Generator" or "MTG" 500 for creating a magnetic transparency through a well casing or production tubing. Well casing or production tubing are manufactured of ferromagnetic metal or other substances that are electrically conductive and magnetically permeable. These materials act as a barrier to the passage of magnetic flux, i.e., Barrier Material. The Magnetic Transparency Generator 500 comprises a Saturation Coil 551 for generating a magnetic flux to saturate a portion of the well casing or production tubing, a Transmitter coil, comprising a magnetic flux transmitter 300, a switch 562, a low noise amplifier (LNA) 564, a Receiver Coil 580 for the receipt and measurement of magnetic flux penetrating through the well casing or production tubing, a frequency generator 563, a pulser 566, one or more capacitors 561 and nulling device 582. An output display 582 and a power source 560 are typically located at the well head or surface.

The transmitter coil 301 is the principle element of the Transmitter component ("Transmitter") 300. The Transmitter creates the desired oscillating magnetic flux that is transmitted through a magnetically saturated portion of the well casing (not shown). In the preferred embodiment of the invention, the Transmitter has the capability to generate a plurality of separate magnetic flux, each having distinct frequencies.

The Saturation Coil 551 is a principle element of the MTG 500. It may be contained as part of the Transmitter component or the Receiver component. The Saturation Coil generates a magnetic flux that couples with and saturates a portion of the well casing. When the well casing, or production tubing, is saturated with magnetic flux, one or more additional magnetic flux from the Transmitter 300 may pass through into the surrounding media. Preferably, the Saturation Coil generates a low frequency or constant magnetic flux. The magnetic flux of the Transmitter will preferably be at a higher frequency than the frequency of the saturation flux.

The Receiver 580 may be combined with a separate Saturation Coil, thereby allowing the Receiver to be placed away from the Transmitter. This has a number of advantages, including facilitating nulling between the Transmitter and Receiver.

In the embodiment of the invention illustrated in FIG. 1, the sub-components contained within the Electronics component 570 are shown. The Power Supply 560 and Output Display 583 may be located at the surface. It will be appreciated by persons skilled in the art that the above does not require the components to be in contact with the Barrier Material, e.g., well casing, in order to create the Transparency.

In simple terms, the apparatus works in the following steps: (1) the Saturation Coil 551, when energized, acts as an electromagnet. The Saturation Coil creates one or more fields of magnetic flux adjacent or near the Barrier Material, which can be the well casing or the well casing and the production tubing. The Saturation Coil creates a partial or full magnetic saturation of the Barrier Material immediately proximate to the Saturation Coil. Saturation results in the magnetic permeability of the Barrier Material being substantially lowered. When fully saturated, that portion of the Barrier Material cannot absorb further magnetic flux, thereby allowing additional flux to pass through the well casing or production tubing. In such a state, that portion of the well casing has become transparent to magnetic flux. This partially or fully saturated section is known as a "Transparency" or a Metallic Transparency™. (2) The Transmitter 300 then creates one or more fields of additional magnetic flux having frequencies preferably equal to or greater than the saturation flux. The second field of magnetic flux is engaged with the section of full or partial saturation (having greatly reduced magnetic permeability) allowing the Transmitter flux to pass through the Transparency of the well casing and enter the surrounding geologic formation. (3) Media in the surrounding formations that contain electrically conductive properties interact with the oscillating magnetic flux created by the Transmitter. Through basic electromotive forces, a separate oscillating magnetic flux is induced in the electrically conductive media. (4) The induced magnetic flux travels back to the well casing. As in step No. 1 above, the same or similar Saturation Coils 551 create a Transparency near the Receiver so that the induced magnetic flux can be received and measured. (5) The Receiver converts the induced flux into electronic signals that are filtered and processed in order to determine the resistivity of media located outside the casing. The received signal is processed using diodes, differential amplifiers, and noise filters to concentrate and magnify the reacted magnetic waves. The Transmitter Flux is nulled 582 to minimize direct transmission of flux from the Transmitter to the Receiver. The transmitted signal is compared to the received signal and, using the changes in amplitude and phase, the resistivity is determined and displayed. These signals are then sent to the Output display 583 for further processing, display, and recording.

By altering the concentration of the saturation flux, the frequency of the Transmitter flux, placement of the Transmitters and Receivers, or by the orientation of the Transmitter in relation to the Saturation Coil, it is possible to vary the depth of penetration into the geologic formation, thus building a detailed characterization profile of the formation at various distances from the casing. The Metallic Transparency may also be used to directionally control the flux transmitted through the casing and into the surrounding geologic formation. This may be achieved by Magnetic Lensing™.

In practicing the invention, it is useful to know the electrical conductivity and permeability of the Barrier Material. This allows the optimization of the input frequency, amplitude and power. To eliminate the effects of a varying permeability in a Barrier Material, it is necessary to create a Transparency by reducing the permeability of the Barrier Material as close to unity as possible while the frequency of the magnetic flux is varied. When the permeability of the Barrier Material is close to unity, total or near total saturation of the Barrier Material is achieved. Then, with the frequency magnetic flux held constant, change in the amount of the transparency varies the permeability. This is accomplished by varying the saturation value. The Conductivity of the Barrier Material is measured by creating a Metallic Transparency, subjecting this transparent area to varying frequencies and monitoring the received signal. The last transmitted signal detected at the Receiver determines the conductivity of the Barrier Material when at total saturation.

Figure 2:
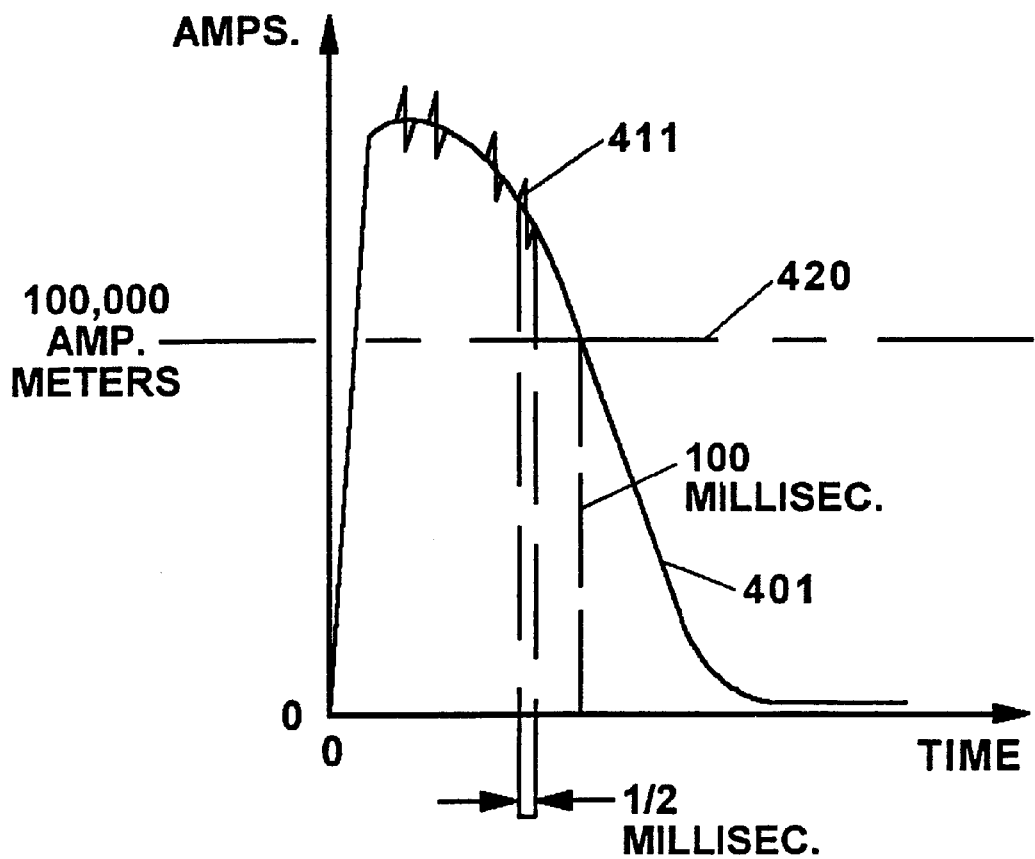
FIG. 2 illustrates an embodiment of the invention whereby an oscillating magnetic flux saturates a Barrier Material and a second, higher frequency oscillating flux is transmitted through the Barrier Material during the time of saturation.

FIG. 2 illustrates the utilization of saturation flux 401 in conjunction with a higher frequency Transmitter Flux 411. It will be appreciated by persons skilled in the art that benefits may be achieved by the use of a saturation magnetic flux oscillating above and below the required saturation flux.

Figure 3:
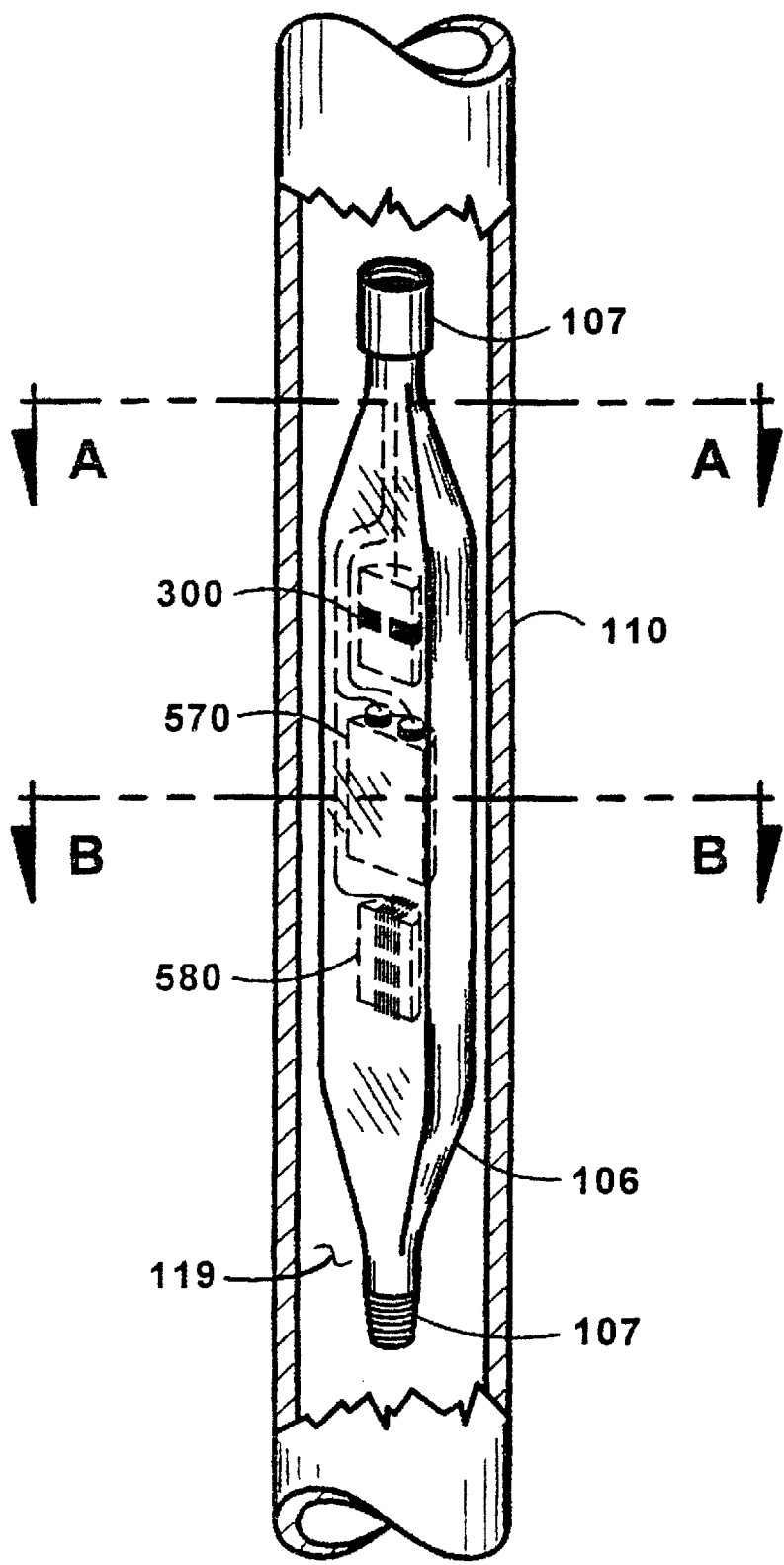
FIG. 3 illustrates an embodiment of the invention with the permanently installed down-hole components housed within a modified production tubing assembly.
Figure 3A:
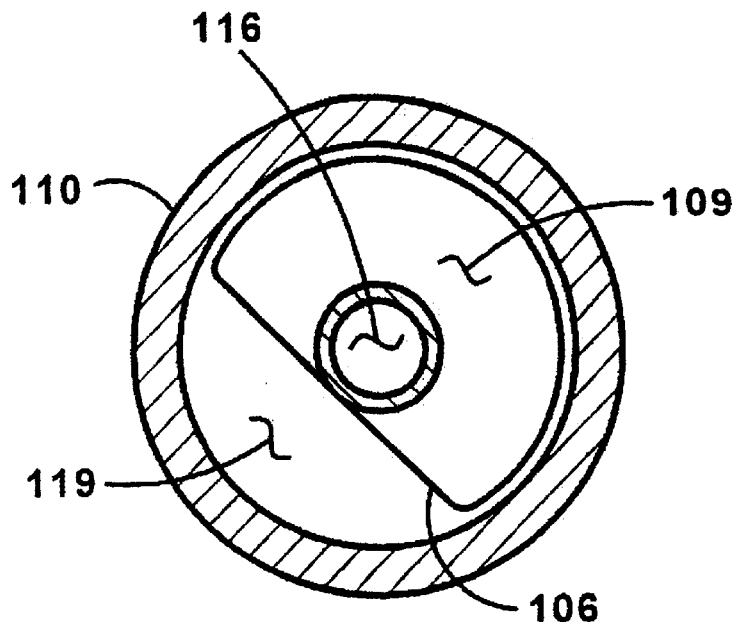
FIG. 3A illustrates a sectional view of the production tubing within the well casing along the line X—X.
Figure 3B:
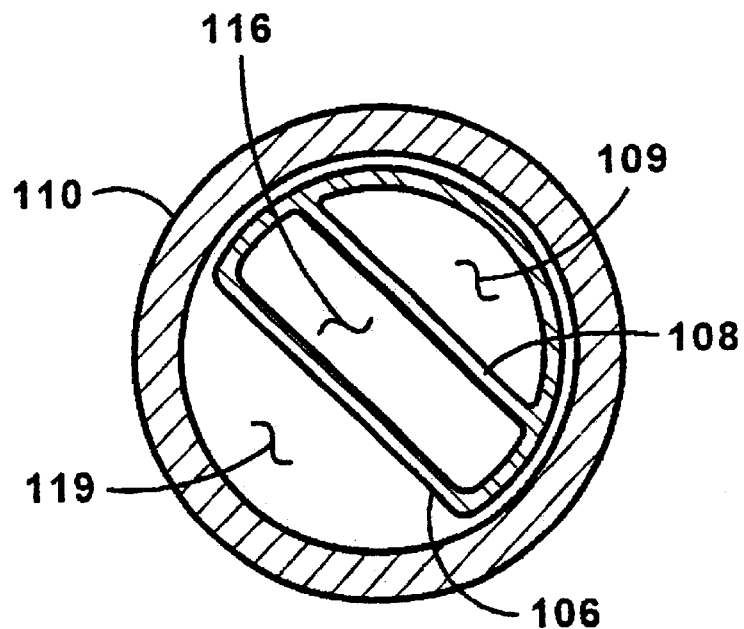
FIG. 3B illustrates a sectional view of the production tubing within the well casing along the line XI—XI.

FIG. 3 illustrates another embodiment wherein the components of the Permanent Down Hole Tool 572 configured in a manner to minimize any restriction of the cross sectional area of the production tubing annulus 116 utilized to transport hydrocarbon to the surface. The housing 109 containing the transmitter, receiver and electronic components is preferably located along a side of the modified tubing section. The housing separates and protects the components from the flow of hydrocarbon through the remaining portion of the modified section. The components of the Permanent Down Hole Tool 572 comprise at least one Transmitter component 300, an electronics component 570, and at least one Receiver component 580. In addition, the apparatus subject of the invention consists of a set of instruments (not shown), including operator controls at the wellhead and/or surface, and power and communication means that links the downhole components to the surface instruments. The operator's console or display also indicates historical trends of resistivity.

The outside diameter of the modified production tubing allows the tubing 106 to be installed within the well casing 110. The modified tubing section may be strung directly in line with conventional production tubing and lowered into the hole to the appropriate zone of the formation with the installation of the production tubing.

In other embodiments, the apparatus can be configured with a plurality of components. For example, multiple receiver assemblies could be utilized with one or more transmitter assemblies. In other examples, a plurality of components, each with at least one transmitter, electronics and receiver component may be placed at multiple downhole vertical depths within the well. In still other embodiments, the down hole components may be configured in series or parallel. Other embodiments may utilize a configuration of a plurality of components to achieve transparencies, magnetic flux transmission and reception in multiple directions within the same vertical depth.

Figure 4:
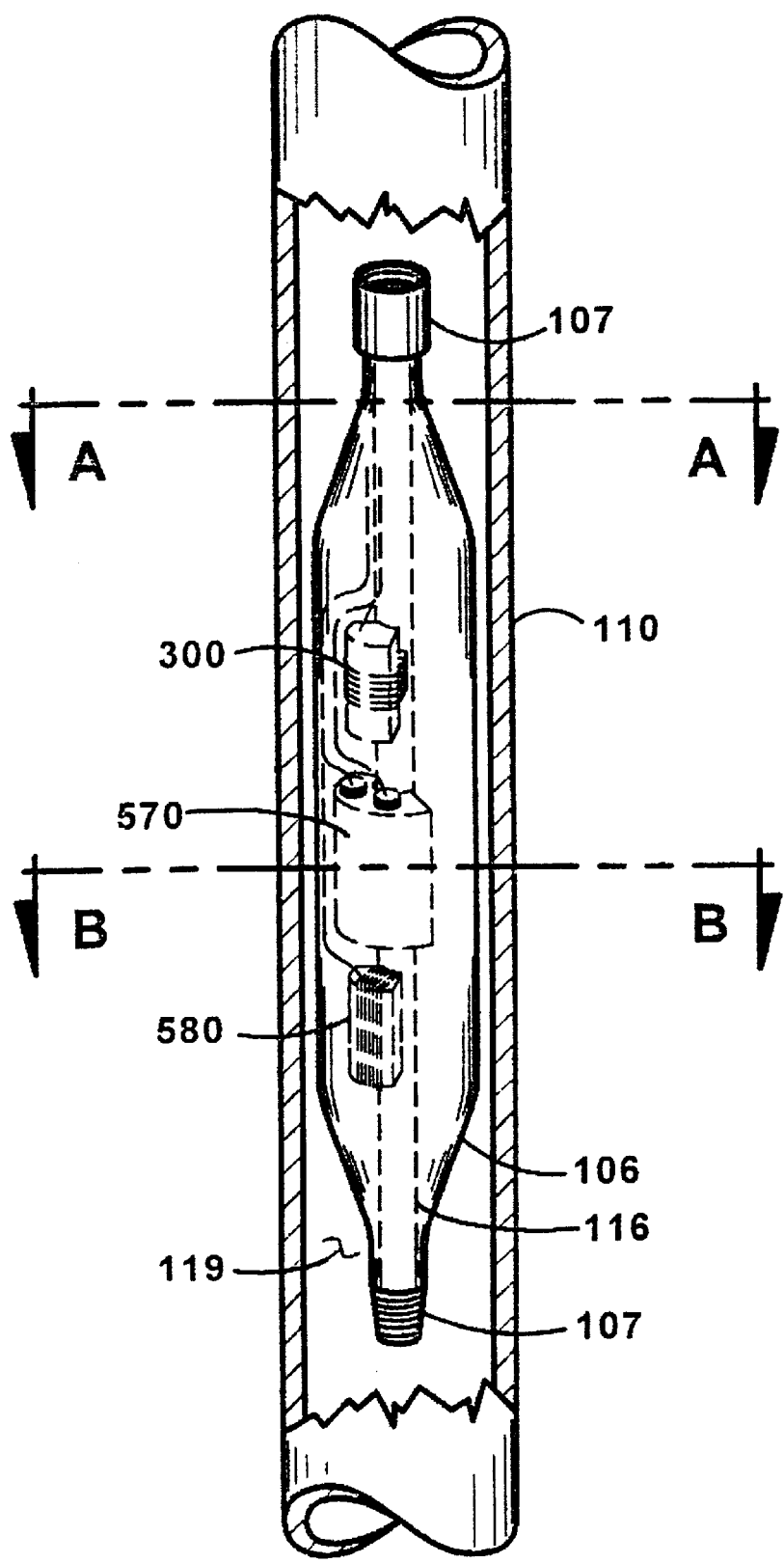
FIG. 4 illustrates another embodiment of the invention wherein the permanently installed components are housed within the modified tubing but separated from the hydrocarbon production flow.
Figure 4A:
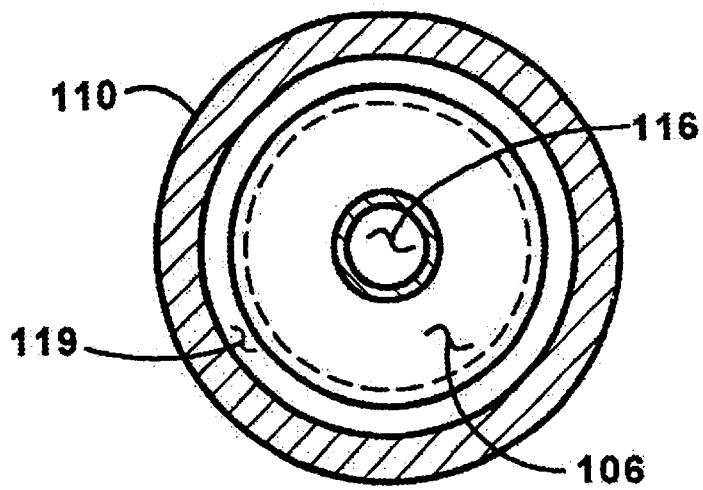
FIG. 4A is a sectional view of the production tubing within the well casing illustrating the location of the permanently installed down hole components along the line X—X.
Figure 4B:
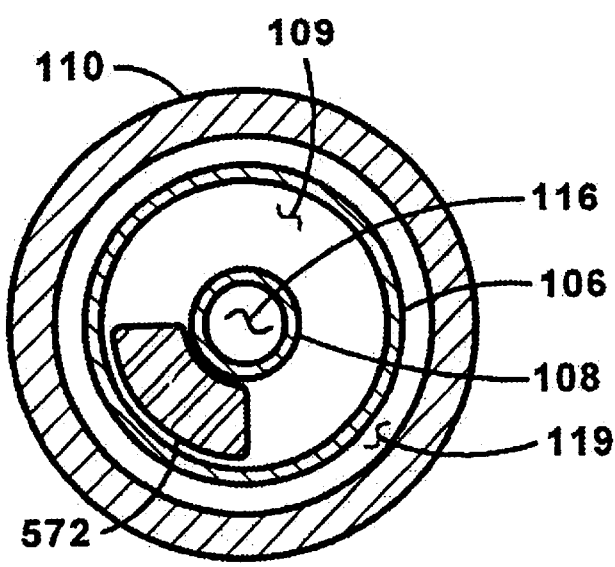
FIG. 4B is a sectional view of the production tubing within the well casing along line XI—XI and illustrating the location of the permanently installed down hole components.

FIG. 4 illustrates a configuration of the Permanent Down Hole Tool 572 wherein the Transmitter 300, Electronics 570 and Receiver 580 components are inside a modified section of Production Tubing 106. The down-hole components of the apparatus also consists of a modified or enlarged section of production tubing 106 with threaded connectors 107 on both ends that couple with conventional production tubing (not shown). In contrast to FIG. 3, the design of the modified tubing section of FIG. 4 maintains the continuous axial orientation of annulus 116 conveying the hydrocarbon to the surface. Also within the modified tubing section is a housing compartment 109 (not shown) containing the Transmitter 300, Electronics 570 and Receiver 580 components. The tubing section also contains a component for connection to the communication and power component that extends to the controls located at the surface or the well head.

Figure 4C:
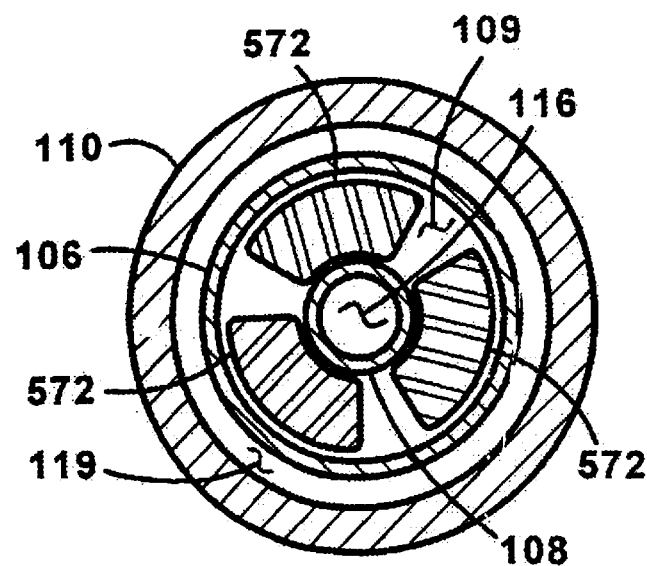
FIG. 4C shows another embodiment with a plurality of Transmitter or Receiver components.

FIG. 4C illustrates an embodiment of the present invention wherein multiple permanent downhole tools 572, each containing Transmitter Components and Receiver components, are placed around the outer circumference of the hydrocarbon production annulus 116. A group of components, i.e., transmitter and receiver components can function in series to allow directional determination of geologic formation resistivity around the circumference of the casing. For example, each system could cover a 120 degree arcs of the circumference of the casing.

Figure 5:
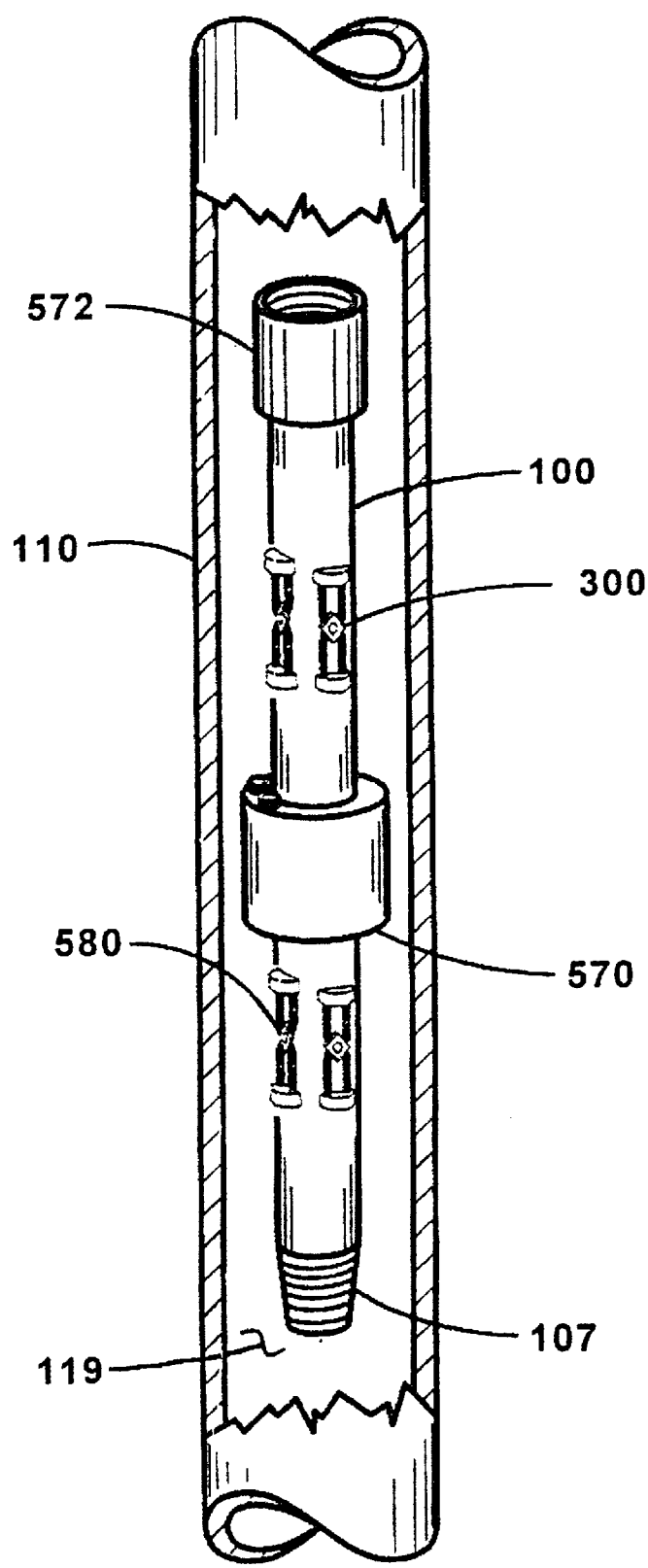
FIG. 5 illustrates another embodiment of the invention wherein the permanently installed down-hole components are located outside of the production tubing.

FIG. 5 illustrates an embodiment wherein the Transmitter Component 300, Electrical component 560 and Receiver Component 580 may be placed within the Auxiliary Conduit 119 on the outside of conventional production tubing 100 within the permanently installed well casing 110. The components may be separately or collectively covered as desired for protection or insulation. Communication and power means among the components and with the surface are not shown. The composition and arrangement of components can be varied.

The standard communication and power cables that are used currently for production systems provide the linkage from the apparatus to the surface controls. These communication and power cables can be located within the auxiliary conduit 119. This apparatus needs no more power or special communications than is already available by means of existing down-hole sensing systems.

It will be appreciated that the Permanent Down Hole Tool 572 may be fixed at the desired depth for monitoring the surrounding formation or production zone. It will be further appreciated that a plurality of these Tools may be installed to provide monitoring capacity at a plurality of locations or directions. It will be further appreciated that the modified production tubing may contain sections that are not Barrier Materials. These sections can be placed proximate to the Transmitter and Receiver Components, thereby eliminating the need for saturating the production tubing with flux to create a Metallic Transparency in the tubing. Such a Transparency will still be required for the well casing, but obviously power will be conserved and the power or size of the Saturation Coil decreased.

The Transmitter component may include a Saturation Coil to create the Metallic Transparency in the casing or tubing through which magnetic flux may be transmitted into the surrounding media of the geologic formation. The Metallic Transparency may be used to directionally control the flux transmitted through the casing and into the surrounding geologic formation. This can be achieved by limiting, in a controlled manner, the extent of saturation of the casing or tubing. When only partially saturated, the permeability is significantly reduced, but magnetic flux engaged with the partially saturated area will cause eddy currents to be induced. The eddy currents, in turn, induce a second separate magnetic flux that is emitted from the partially saturated area. Since the permeability of this partially saturated area is significantly reduced, the direction of the magnetic flux emitted from the surface of the tubing or casing will be altered. Therefore, by controlling the geometry and degree of partial saturation, the direction of the magnetic flux can also be controlled. This permits the magnetic flux to be focused at a further distance or different direction than would otherwise be achieved with complete saturation. This technique utilizes is termed Magnetic Lensing™.

In another embodiment of the configuration shown in FIG. 1, the Receiver assembly 580 may include separate Transparency Coil 551, thereby utilizing a separate Transparency. This configuration can be termed a bi-static configuration and may facilitate nulling of magnetic flux between the Transmitter component 300 and the Receiver component 580.

The Electronics component 570 contains necessary electronic circuitry for the powering and control of the Transmitter and Receiver components, and processes and communicates information between the surface instruments and the Permanent Down Hole Tool. The Electronics component 570 may also provide electronic nulling means 582 between the Transmitter and the Receiver. The Electronic component may also provide amplification 564 of the received magnetic flux, as well as signal filtering and data processing of the transmitted and received signals.

Figure 6:
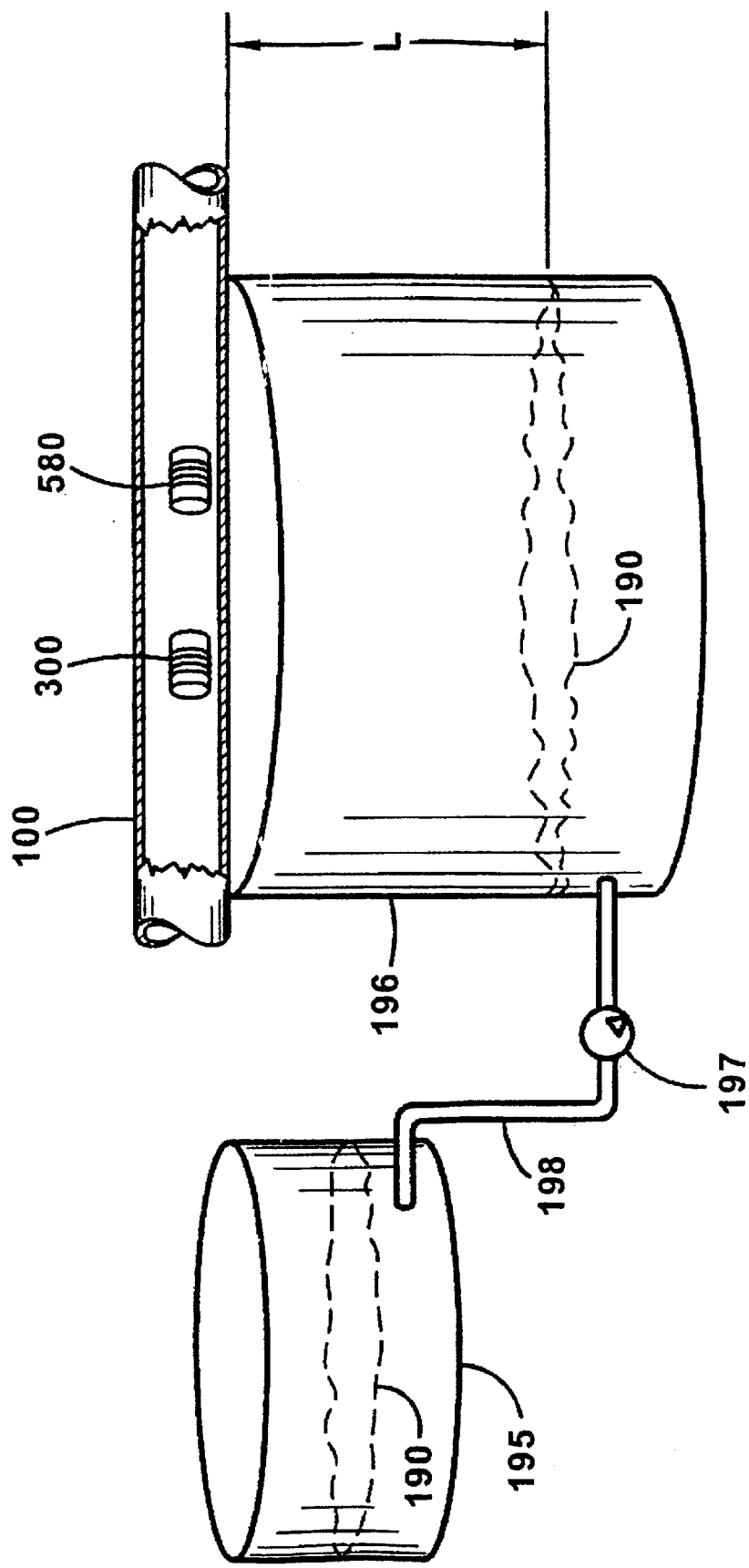
FIG. 6 illustrates an experimental apparatus utilized to demonstrate the invention's ability to measure changes in resistivity in media outside a well casing, Illustrates.
Figure 7:
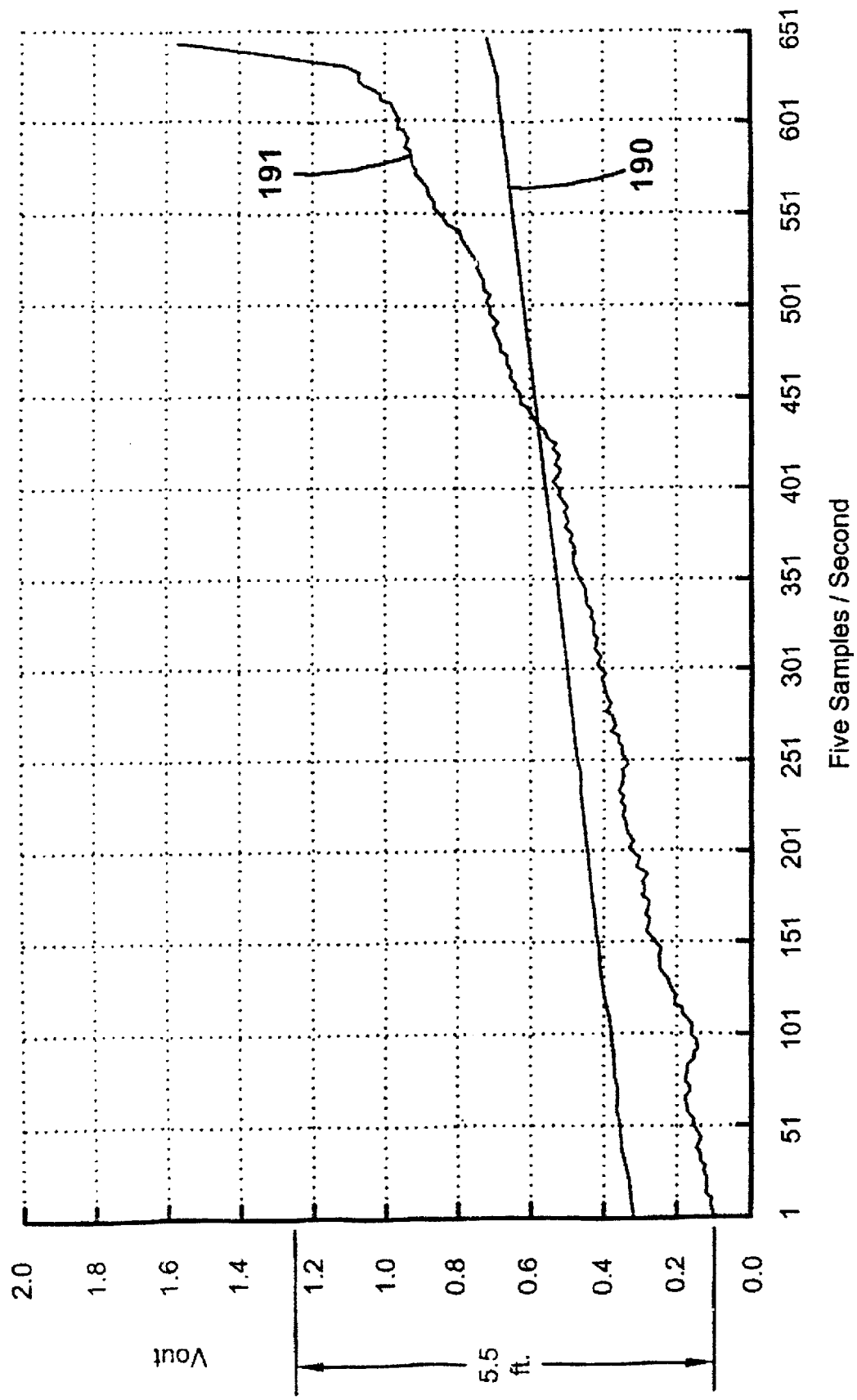
FIG. 7 illustrates the experimentally measured changes in resistivity of the media outside the casing, as measured from within the well casing.

FIG. 6 illustrates the apparatus used to demonstrate the invention. Receiver means 580 and Transmitter means 300 were placed in a section of ferromagnetic metal pipe. A Saturation Coil (not shown) generated a Metallic Transparency proximate to the Transmitter and Receiver. This configuration of components within the metal pipe was placed above a tank 196. The apparatus was activated and measurements were taken of the resistivity of the media below the pipe. Water was added to the tank from an opening at the bottom by means of piping 198, valve 197 and second tank 195. This caused the level of the water 190 to rise in the tank 196 below the pipe. As the surface of water approached the pipe, the measured values of resistivity changed. FIG. 7 shows the change in measured resistivity 191 compared to the change in water level 190.

The given description illustrates that the apparatus can analyze/measure the resistivity in the producing zone just outside the casing for a distance of at least 4 feet. By taking these measurements continuously or over short intervals, the resistivity can be trended. Trending makes it possible for the operator to see very slight changes in resistivity, and will signal even slightly higher concentrations of water in the hydrocarbon reservoir. The invention provides unique information that is important both to the reservoir engineer and to the production engineer, by providing both real-time information and historical trends, useful in managing the production zone and its flows. The present invention also provides information useful in defining the surrounding geology or detecting changes in the geologic formation.

In the foregoing description, a single power level, frequency, and direction is discussed. However, the apparatus can be readily modified by varying the strength and frequency of the transmitted signals, and by adding transmitter/receivers in multiple directions or at different spacing, or by adding complete sets of additional down hole devices at multiple production zones. All such variations would be appreciated by those skilled in the art.

What I claim is:

1. The method for measuring resistivity of media in geologic formations from at least one fixed location through the well casing or tubing material having a first inner side and a second outer side and manufactured from a group containing at least ferromagnetic or paramagnetic materials comprising:

(a) generating a magnetic flux proximate to but electrically isolated from a first inner side of the material into engage and saturate a portion of the material through the thickness to the second outer side;

(b) generating a second magnetic flux proximate to but electrically isolated from the saturated first inner side and transmitting the second flux through the second outer side.

(c) Using means near but electrically isolated from the first inner side to detect magnetic flux passing through a saturated area from the second side to the first side.

2. The method of claim 1 comprising orienting anisotropically the magnetic flux engaging the material.

3. The method of claim 2 further comprising orienting the magnetic flux such that a significant portion of the flux engaging the first side of the material are concentrated substantially normal too the first side of the material.

4. The method of claim 1 further comprising using less than 300 watts of electrical power.

5. The method of claim 1 wherein at least one means for performing the steps of generating the magnetic flux saturating the material, transmitting magnetic flux through a portion of the material and detecting magnetic flux through the material are placed in a well extracting a hydrocarbon from below the surface of the ground.

6. The method of claim 5 wherein the means generating the magnetic flux saturating the material, transmitting magnetic flux through a portion of the material and detecting magnetic flux through the material are placed in a hydrocarbon production tubing in a manner to permit continued passage of a hydrocarbon through the tubing.

7. The method of claim 6, wherein the means generating the magnetic flux saturating the material, transmitting magnetic flux through a portion of the material and detecting magnetic flux through the material are placed in a production tubing within a well casing.

8. The method of claim 7, wherein the means generating the magnetic flux saturating the material, transmitting magnetic flux through a portion of the material and detecting magnetic flux through the material are placed in a housing within the tubing separate from the passage of the hydrocarbon through the tubing.

9. The method of claim 8, wherein the housing separates the means from contact with the hydrocarbon passing within the production tubing.

10. The method of claim 9, wherein the means generating the magnetic flux saturating the material, transmitting magnetic flux through a portion of the material and detecting magnetic flux through the material are placed on one side of the tubing.

11. The method of claim 9, wherein the means generating the magnetic flux saturating the material, transmitting magnetic flux through a portion of the material and detecting magnetic flux through the material are placed within a housing surrounding the passage of hydrocarbon through the tubing.

12. The method of claim 5 wherein the means generating the magnetic flux saturating the material, transmitting magnetic flux through a portion of the material and detecting magnetic flux through the material are placed on the outside of the production tubing and within the inside of the well casing.

13. The method of claim 12 wherein the means generating the magnetic flux saturating the material, transmitting magnetic flux through a portion of the material and detecting magnetic flux through the material are covered.

14. The method of claim 13 wherein the covering comprises a non-magnetically permeable material.

15. The method of claim 5 wherein the means transmitting magnetic flux and detecting magnetic flux through the material are installed proximate to means for saturating separate portions of the material.

16. The method of claim 5 herein the a plurality of means performing the steps of transmitting magnetic flux and detecting magnetic flux through the material are installed proximate to means for saturating separate portions of the material.

17. The method of claim 9, further comprising installing the means for saturating, transmitting and receiving magnetic flux proximate to at least portions of the production tubing comprised of non-magnetically permeable materials.

18. The method of claim 5 further comprising only partially saturating the portion of the material through which magnetic flux may be transmitted.

19. The method of claim 18 further comprising controlling the location and extent of saturation of the material to focus the magnetic flux penetrating into the media.

20. The method of claim 5 further comprising placing the controls and power supply at the surface of the hydrocarbon production well.

21. The method of claim 20 further comprising connecting the controls and power supply to the means for saturating, transmitting and receiving magnetic flux with power and communications means.

22. The method of claim 21 further comprising installing the communication means in a auxiliary annulus between the inside of the well casing and the outside of the an production tubing.

23. An apparatus for measuring resistivity of media in geologic formations from at least one fixed location through well casing or tubing material having a first inner side and a second outer side and manufactured from a group containing at least ferromagnetic or paramagnetic materials comprising:
(a) means for creating at least one magnetic flux proximate to but electrically isolated from a first inner side of a material and engaging at least a portion of the material with magnetic flux such that a saturated area extends through a thickness of the material to a second side;
(b) means for creating and transmitting at least one second separate magnetic flux proximate to but electrically isolated from the first inner side of the material through the saturated area of the material; and
(c) means paced proximate to the first side for detecting magnetic flux passing through a saturate area of material from the second side to the first side.

24. The apparatus of claim 23 wherein the means for generating the magnetic flux saturating the material, transmitting magnetic flux through a portion of the material and detecting magnetic flux through the material are placed in a hydrocarbon production tubing in a manner to permit continued passage of a hydrocarbon through the tubing.

25. The apparatus of claim 24, wherein the means for generating the magnetic flux saturating the material, transmitting magnetic flux through a portion of the material and detecting magnetic flux through the material are placed in a production tubing within a well casing.

26. The apparatus of claim 25, wherein the means for generating the magnetic flux saturating the material, transmitting magnetic flux through a portion of the material and detecting magnetic flux through the material are placed in a housing within the tubing separate from the passage of the hydrocarbon through the tubing.

27. The apparatus of claim 26, wherein the housing separates the means from contact with the hydrocarbon passing within the production tubing.

28. The apparatus of claim 27, wherein the means for generating the magnetic flux saturating the material, transmitting magnetic flux through a portion of the material and detecting magnetic flux through the material are placed on one side of the tubing.

29. The apparatus of claim 26, wherein the means for generating the magnetic flux saturating the material, transmitting magnetic flux through a portion of the material and detecting magnetic flux through the material are placed within a housing surrounding the passage of hydrocarbon through the tubing.

30. The apparatus of claim 23 wherein the means for generating the magnetic flux saturating the material, transmitting magnetic flux through a portion of the material and detecting magnetic flux through the material are placed on the outside of the production tubing and within the inside of the well casing.

31. The apparatus of claim 30 wherein the means for generating the magnetic flux saturating the material, transmitting magnetic flux through a portion of the material and detecting magnetic flux through the material are covered.

32. The apparatus of claim 31 wherein the covering comprises a non-magnetically permeable material.

33. The apparatus of claim 23 wherein the means for transmitting magnetic flux and detecting magnetic flux through the material are installed proximate to means for saturating separate portions of the material.

34. The apparatus of claim 23 wherein the a plurality of means for performing the steps of transmitting magnetic flux and detecting magnetic flux through the material are installed proximate to means for saturating separate portions of the material.

35. The apparatus of claim 25, wherein portions of the production tubing are comprised of non-magnetically permeable materials installed proximate to means for saturating, transmitting and receiving magnetic flux at least.

36. The apparatus of claim 23 further wherein portions of the material through which magnetic flux may be transmitted are only partially saturated.

37. The apparatus of claim 36 further wherein the location and extent of saturation of the material is controlled to focus the magnetic flux penetrating into the media.

38. The apparatus of claim 23 further wherein controls and power supply for the apparatus are placed at the surface of the hydrocarbon production well.

39. The apparatus of claim 38 wherein controls and power supply for the apparatus are connected to the means for saturating, transmitting and receiving magnetic flux with power and communications means.

40. The apparatus of claim 39 wherein the communication means are installed in an auxiliary annulus between the inside of the well casing and the outside of the production tubing.

41. An apparatus for measuring the resistivity of media in a geologic formation surrounding a hydrocarbon production well casing comprising an electrical power supply, at least one magnetic flux saturation means electrically connected to the power supply and electrically isolated from the casing, at least one magnetic flux transmitter means electrically connected to the power supply and electrically isolated from the casing, at least on capacitor, diode, switch amplifier, nulling device, pulser, at least one magnetic flux receiver means electrically isolated from the casing, communication means, and an out put display.

* * * * *